(12) United States Patent
Enichen et al.

(10) Patent No.: US 6,333,983 B1
(45) Date of Patent: Dec. 25, 2001

(54) METHOD AND APPARATUS FOR PERFORMING STRONG ENCRYPTION OR DECRYPTION DATA USING SPECIAL ENCRYPTION FUNCTIONS

(75) Inventors: Margaret C. Enichen, Poughkeepsie; Ronald M. Smith, Sr., Wappingers Falls; Phil Chi-Chung Yeh, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/991,916

(22) Filed: Dec. 16, 1997

(51) Int. Cl.$^7$ .................................................. H04K 1/00

(52) U.S. Cl. ........................................................ 380/273

(58) Field of Search ..................................... 380/38, 273

(56) References Cited

U.S. PATENT DOCUMENTS

| | | | |
|---|---|---|---|
| 4,203,166 | 5/1980 | Ehrsam et al. | 375/2 |
| 4,218,738 | 8/1980 | Matyas et al. | 364/200 |
| 4,227,253 | 10/1980 | Ehrsam et al. | 375/2 |
| 4,238,553 | 12/1980 | Weddigen et al. | 429/104 |
| 4,238,859 | 12/1980 | Badon, Jr. | 4/509 |
| 4,747,050 | 5/1988 | Brachtl et al. | 364/408 |
| 4,755,940 | 7/1988 | Brachtl et al. | 364/408 |
| 4,850,017 | 7/1989 | Matyas et al. | 380/21 |
| 4,918,728 | 4/1990 | Matyas et al. | 380/21 |
| 4,924,514 | 5/1990 | Matyas et al. | 380/24 |
| 4,924,515 | 5/1990 | Matyas et al. | 380/25 |
| 4,941,176 | 7/1990 | Matyas et al. | 380/21 |
| 4,993,069 | 2/1991 | Matyas et al. | 380/23 |
| 5,007,089 | 4/1991 | Matyas et al. | 380/49 |
| 5,103,478 | 4/1992 | Matyas et al. | 380/25 |
| 5,144,665 | 9/1992 | Takaragi et al. | 380/30 |
| 5,177,791 | 1/1993 | Yeh et al. | 380/45 |
| 5,200,999 | 4/1993 | Matyas et al. | 380/25 |
| 5,432,849 | 7/1995 | Johnson et al. | 380/21 |

OTHER PUBLICATIONS

Bruce Schneier, Applied Cryptology, John Wiley & Sons, Inc. pp. 1, 280–283, Oct. 1995.*
Menezes et. al., Applied Cryptography, CRC Press, 1997.*
OS/390 Integrated Cryptographic Service Facility—Application Programmers Guide, Ver.2, Rel. 4—SC23–3796–01.
SET Secure Electronic Transaction Specification—Book 1: Business Description—Ver. 1.0—May 31, 1997—online http://www.visa.com.
Data Encryption Standard, Federal Information Processing Standards Publication—FIPS PUB 46—Jan. 15, 1977.

(List continued on next page.)

Primary Examiner—Gail Hayes
Assistant Examiner—James Seal
(74) Attorney, Agent, or Firm—William A. Kinnaman, Jr.

(57) ABSTRACT

A method and apparatus for decrypting an input block encrypted under a predetermined key in a cryptographic system having a cryptographic facility providing cryptographic functions for transforming blocks of data. The cryptographic functions include an encryption function for encrypting a block under a predetermined key and a transformation function for transforming a block encrypted under a first key to the same block encrypted under a second key. The cryptographic functions have at least one key pair with the property that successive encryption of a block under the keys of the pair regenerates the block in clear form. The input block is first transformed into an intermediate block encrypted under one of the key pair using the transformation function. The intermediate block is then further encrypted under the other of the key pair using the encryption function to generate an output block successively encrypted under the keys of pair, thereby to regenerate the input block in clear form. The invention is useful in cryptographic systems in which the decryption function being emulated by the transformation and encryption functions is unavailable for export control or other reasons.

22 Claims, 10 Drawing Sheets

OTHER PUBLICATIONS

Cryptography: A New Dimension In Computer Data Security—Meyer al—J. Wiley 1982, pp. 72–73, 147–153, 243–249 and 696–697.

IBM TDB vol. 36, No. 3, 3/93—"Method of Thwarting Cryptographic Instruction Manipulation . . . Delay" by D. Johnson et al, pp. 415–418.

IBM TDB vol. 36, No. 11, 11/93—"Multiple–Entry Key Look–Aside Table . . . Functions" by Butter et al, pp. 437–442.

IBM TDB vol. 34, No. 9, 2/92—"Method For Authenticating Key Data Set Records . . . Codes" by Le et al, pp. 104–108.

IBM TDB vol. 28, No. 11, 4/86—"Terminal Master (Cryptographic Key Verification" by Martin et al, pp. 4697–4700.

IBM TDB vol. 34, No. 11, 4/92—"Controlled Access To System Managed Data Keys Via A Security Token", by Matyas et al, pp. 70–74.

IBM TDB vol. 34, No. 11, 4/92—"Control Vector–Based Method For Controlling Export . . . Keys", by Johnson et al, pp. 85–88.

IBM TDB vol. 35, No. 2, 7/92—"Method For Providing Cryptographic Separation . . . Keys", by Abraham et al, pp. 111–113.

IBM TDB vol. 24, No. 1B, 6/81—"Application For Personal Key Crypto With Insecure Terminals", by Lennon et al, pp. 561–565.

IBM TDB vol. 24, No. 3, 8/81,—"Terminal Control of Encipher And Decipher Data Operations", by Ehrsam et al, pp. 1334–1339.

IBM TDB vol. 24, No. 12, 5/82—"Personal Verification and Message Authentication . . . Keys", by Lennon et al, pp. 6504–6509.

IBM TDB vol. 25, No. 9, 2/83—"Improved Key Generation Procedure" by Lennon et al, pp. 4932–4933.

IBM TDB vol. 28, No. 3, 8/85—"Transaction Completion Code Based On Digital Signatures" by Lubold et al, pp. 1109–1122.

* cited by examiner

METHOD AND APPARATUS FOR PERFORMING STRONG ENCRYPTION OR DECRYPTION DATA USING SPECIAL ENCRYPTION FUNCTIONS

BACKGROUND OF THE INVENTION

1. Field of the Invention

This invention relates to a method and apparatus for performing strong encryption or decryption of data using special encryption functions of a cryptographic facility. More particularly, the invention relates to a method and apparatus for performing 56-bit DES encryption of data for financial processing or other purposes using a cryptographic facility whose data encryption and decryption functions have been degraded to conform with export limitations.

2. Description of the Related Art

SET (Secure Electronic Transaction) is a protocol developed jointly by VISA International, MasterCard, and other companies for safeguarding payment card purchases made over open networks. The SET protocol specifies the use of DES (Data Encryption Standard) encryption and decryption using an 8-byte DES encryption key for the protection of purchase information and payment card information. A key length shorter than eight bytes is not allowed.

The U.S. Government regulates the export of products providing general purpose strong encryption. The use of DES with encryption keys longer than 40 bits for data encryption/decryption is not allowed on most machines shipped outside the U.S. Such machines are configured in the manufacturing environment so that hardware-implemented DES encryption or decryption is not enabled for invocation by software. SET itself is exportable. Products which implement the SET protocol currently do so via a software implementation. This implementation is not as secure as a hardware-based implementation because cryptographic keys appear in the clear in main storage.

The problem being solved is how to meet the SET protocol standards which require the use of DES encryption/decryption with an 8-byte DES encryption key in a secure manner (i.e., without disclosing keys in the clear) on a machine which does not have 56-bit DES enabled for software use.

SUMMARY OF THE INVENTION

In order to provide hardware DES encryption and decryption for SET data on an exportable machine, both the encryption and the decryption process make use of hardware cryptographic primitive operations which do not require that strong encryption be enabled. The encryption and decryption processes are described below.

DESCRIPTION OF THE PREFERRED EMBODIMENT

Figure 1:
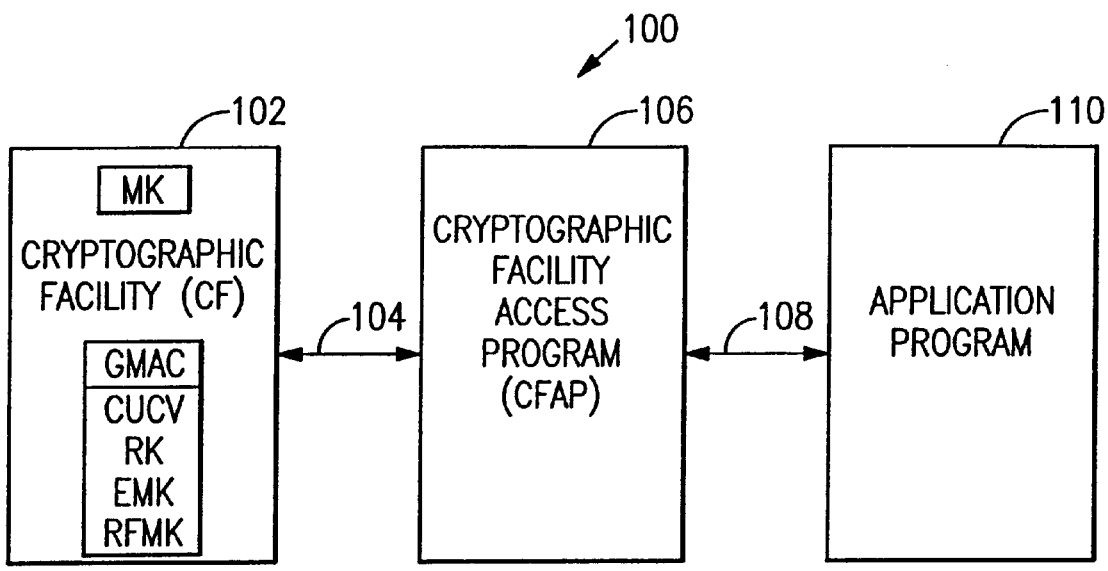
FIG. 1 shows a cryptographic system 100 incorporating the present invention.

FIG. 1 shows a cryptographic system 100 incorporating the present invention. System 100 includes a cryptographic facility (CF) 102 that is accessed by a cryptographic facility access program (CFAP) 106 via an interface 104. CFAP 106 is in turn accessed by an application program (or simply application) 110 via a cryptographic application programming interface (API) 108. In a preferred embodiment, CF 102 comprises a special-purpose cryptographic processor, while CFAP 106 comprises a program residing on a program storage device (not shown) executing on a general-purpose processor (not shown) along with application 110. More particularly, while the present invention is not limited to a specific platform, in an IBM S/390 environment CF 102 may comprise the cryptographic coprocessor of an IBM Parallel Enterprise Server G3 or G4 processor and CFAP 106 may comprise the Integrated Cryptographic Service Facility (ICSF), a component of the OS/390 operating system. CFAP 106 is described in the IBM Publication *Application Programmer's Guide: ICSF Version 2 Release 1 with APAR OW29794*, SC23-3976-01, December 1997, incorporated herein by reference.

Application 110 issues a request to CFAP 106 over interface 108 whenever it wishes to have a specified cryptographic service performed, such as encryption, decryption, message authentication code (MAC) generation or verification, or the like. Upon receiving such a request from application 110, CFAP 106 either performs the service itself or issues one or more calls to CF 102 over interface 104 to have the latter perform all or part of the requested operations on its behalf. When CFAP 106 has completed the requested service (either by itself or with the assistance of CF 102), it sends a response back to the requesting application over the interface 108.

While the present invention may be used with other applications, application 110 may comprise an application implementing the Secure Electronic Transaction (SET) protocol described, for example in the various books of the publication *SET Secure Electronic Trawlsaction Specification*, Version 1.0, May 31, 1997, available online at http://www.visa.com and incorporated herein by reference.

Data Encryption Standard (DES)

The encryption and decryption method of the present invention will be described with reference to the Data Encryption Standard (DES). DES encryption is well known in the art, being described in such publications as *Data Encryption Standard*, Federal Information Processing Standards (FIPS) Publication 46, 1977, incorporated herein by reference. Essentially, DES is a block encryption system that operates on a plaintext or cleartext block X of 8 bytes (64 bits) and encrypts it using a 64-bit key K (of which 56 bits are independent and 8 bits are parity bits) to produce a ciphertext block Y, also 8 bytes (64 bits) in length. This may be expressed by the equation:

$$Y = eK(X)$$

where Y is the ciphertext block, X is the plaintext block, and eK denotes DES encryption under the key K.

The plaintext block is recovered from the ciphertext block by means of the corresponding decryption operation using the same key, as indicated by the equation:

$$X = dK(Y)$$

where X and Y are defined as before and dK denotes DES decryption under the key K. Since the same key is used for both encryption and decryption, the DES procedure is sometimes referred to as a symmetric encryption procedure, as distinguished from asymmetric (or public key) procedures in which the encryption and decryption keys are different.

In its basic form, the DES procedure has 56 independent key bits, resulting in a fairly high cryptographic strength, since an exhaustive attack on the space of possible keys would require on average some $2^{55}$ tries. This strength may be increased even further by multiply encrypting the same plaintext block. Thus, in one common mode of multiple DES encryption, shown in FIG. 2, the plaintext block X is first encrypted under a first key K1, then decrypted under a second key K2, then encrypted again under a third key K3 (which is often K1), so that:

$$Y = eK3(dK2(eK1(X)))$$

In this description, it will be assumed that K3=K1, so that the concatenation of K1 and K2 (indicated as K1∥K2) may be regarded as a single logical 128-bit key (of which 112 bits are independent). Note that if K2=K1, then this triple encryption mode becomes equivalent to single encryption under K1.

The encryption described so far is the so-called electronic codebook (ECB) mode, in which each plaintext block X is encrypted independently of any other block X in the message. In the cipherblock chaining (CBC) mode, on the other hand, the encryption results for one input block Xi are used for the next input block Xi+1. Thus, referring to FIG. 3, in the CBC mode of encryption, the first plaintext block X1 is first combined with a 64-bit initial chaining vector (ICV), using exclusive OR (XOR) addition, to produce a result that is then encrypted to produce the first ciphertext block Y1. Y1 is then used as a chaining vector for the next block X2 by XORing it with that block before it is encrypted. The encryption proceeds in a similar manner for each additional input Xi, using the previous encryption result Yi−1 as a chaining vector, until all of the blocks X1–Xn have been encrypted.

Figure 4:
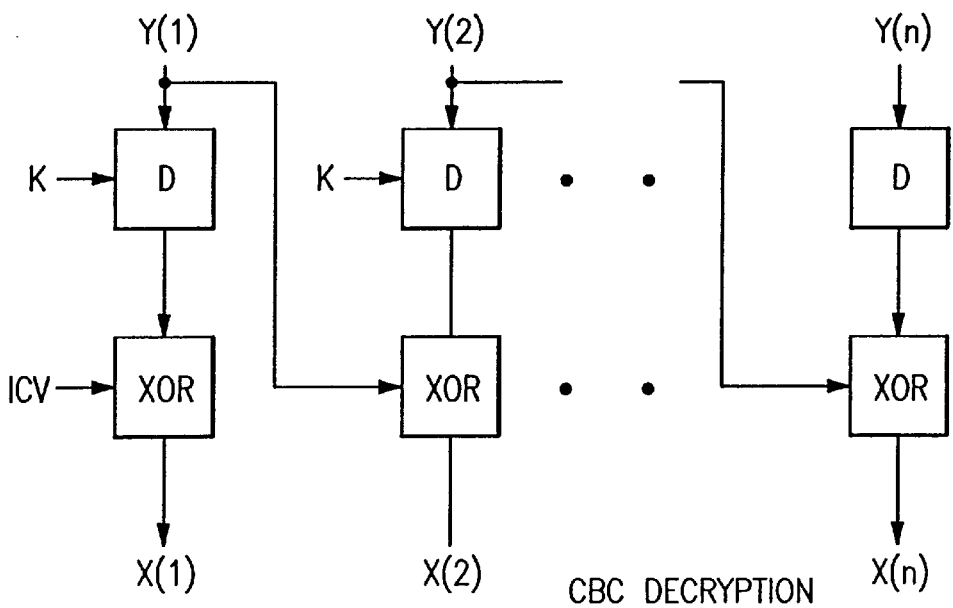
FIG. 4 shows the cipher block chaining (CBC) decryption mode of the prior art.

FIG. 4 shows the corresponding CBC decryption procedure, which is similar to the CBC encryption procedure except for the order of operations. Thus, referring to FIG. 4, the first ciphertext block Y1 is first decrypted using K, then XORed with the same ICV as used for the encryption to produce the first plaintext block X1. For each subsequent block Yi, the block Yi−1 (which is the input rather than the output as in encryption) is used as the chaining vector.

The DES procedure has what are known as weak keys, which have the property that performing the encryption procedure twice on a plaintext block using the same key regenerates the same plaintext block. Thus, for a weak key W:

$$eW(eW(X)) = X$$

for any X. There are four such weak DES keys; they are, in hexadecimal notation:

01 01 01 01 01 01 01 01

1F 1F 1F 1F 0E 0E 0E 0E

E0 E0 E0 E0 F1 F1 F1 F1

FE FE FE FE FE FE FE FE

In addition, there are semiweak keys occurring in pairs having the property that for a pair of such keys W and W', performing the encryption procedure under the first key followed by encryption under the second key (or vice versa) regenerates the same plaintext block. Thus, for a pair of semiweak keys W and W':

$$eW(eW'(X)) = eW'(eW(X)) = X$$

for any X. In DES there are twelve such semiweak keys, consisting of the following six pairs:

E0 FE E0 FE F1 FE F1 FE

FE E0 FE E0 FE F1 FE F1

1F FE 1F FE 0E FE 0E FE

FE 1F FE 1F FE 0E FE 0E

01 FE 01 FE 01 FE 01 FE

FE 01 FE 01 FE 01 FE 01

1F E0 1F E0 0E F1 0E F1

E0 1F E0 1F F1 0E F1 0E

01 E0 01 E0 01 F1 01 F1

E0 01 E0 01 F1 01 F1 01

01 1F 01 1F 01 0E 01 0E 1F 01 1F 01 0E 01 0E 01

This property of weak and semiweak keys possessed by the DES encryption procedure is exploited in the decryption procedure of the present invention, as described below.

Cryptographic Facility

As noted above, CF 102 performs various cryptographic operations in response to requests from CFAP 106, including encryption or decryption of data, generation of message authentication codes (MACs), and various key management operations. Since the latter operations figure prominently in the description that follows, they will be briefly described.

CF 102 implements a key management hierarchy including a master key MK, key-encrypting keys (KEKs), and data-encrypting keys (DEKs). The master key MK is a double-length (128-bit) key used only to encrypt other keys. The master key MK always remains in a secure area in CF 102. KEKs (or transport keys) are double-length keys used to protect keys that are distributed from one system to another. Data-encrypting keys are single-length (64-bit) keys that are used to encipher, decipher or authenticate data. (The terms "encipher" and "encrypt" are used interchangeably in this specification, as are the terms "decipher" and "decrypt".)

The two KEKs of principal interest here are importer keys and exporter keys. Importer keys protect keys that are sent to the local system from another system (which has the same key as an exporter key) or that are stored externally in a file for later import to the local system. Exporter keys, on the other hand, protect keys of any type that are sent from the local system to another system (which has the same key as an importer key).

Key encrypting keys and data-encrypting keys are stored outside the secure boundary of CF 102, but only in encrypted form, encrypted under a variant of the master key MK. More particularly, a master key variant of a specified key type is generated by combining the master key MK with the control vector (CV) for that type. In the preferred implementation, a control vector is a quantity that is used to control the use of the key encrypted under the master key variant. The use of such control vectors is described in such publications as U.S. Pat. Nos. 4,918,728, 4,924,515, 4,941,176, 4,993,069, 5,007,089, 5,103,478, and 5,432,849, all incorporated herein by reference.

Figure 5A:
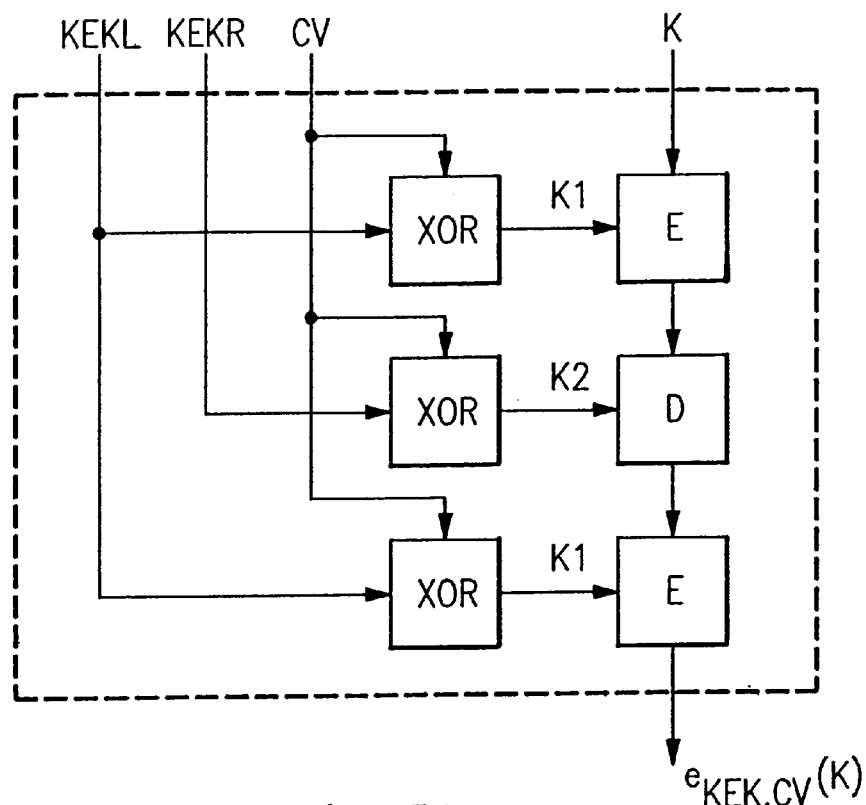
FIG. 5A shows the encryption of a single-length key using a control vector.

FIG. 5A shows the manner in which a double-length key-encrypting key KEK (composed of a left half KEKL and a right KEKR) is combined with a control vector CV to encrypt a single-length key K. The procedure is basically a variation of the triple encryption procedure shown in FIG. 2, in which KEKL is XORed with CV to derive a key K1 for the first and third (encryption) stages, while KEKR is XORed with CV to derive a key K2 for the second (decryption) stage. In effect, KEK is XORed with the concatenated vector CV||CV before being used in the encryption procedure of FIG. 2. In this specification, encryption of a key K under a key-encrypting key KEK using a control vector CV in this manner will be indicated by the notation eKEK.CV(K), where e implies triple encryption under a double-length key and KEK.CV (=KEK XOR CV||CV) is the indicated variant of KEK used for encryption. The corresponding reverse operation of decryption is performed in an analogous manner and is indicated by the notation dKEK.CV(K).

Figure 5B:
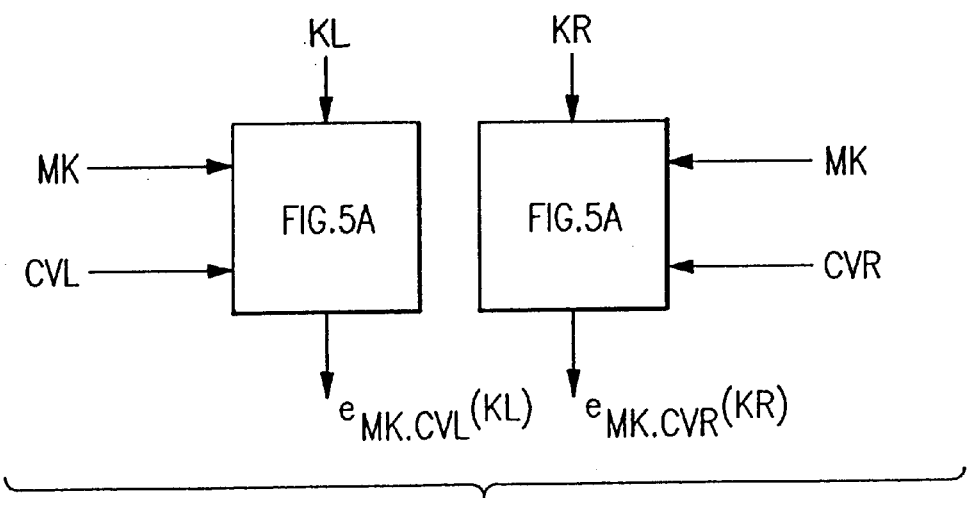
FIG. 5B shows the encryption of a double-length key using a control vector.

If the key being encrypted is a double-length key (e.g., an importer or exporter key), the encryption is performed separately for the two halves, using separately derived variants of the encrypting key (either a master key or a transport key). Thus, FIG. 5B shows the encryption of a double-length key K (composed of a left half KL and a right half KR) under a master key MK using a left-half control vector CVL and a right-half control vector CVR. To encrypt K, the procedure of FIG. 5A is performed separately for each input half KL and KR, using CVL for KL and CVR for KR, to generate encryption products eMK.CVL(KL) and eMK.CVR(KR). Although separate encryptions are performed for the two input halves, the procedure will sometimes be conveniently indicated by the shorthand notation eMK.CV(K), where CV is taken to imply CVL for KL and CVR for KR. Particular notations for master key variants described herein include MK.imp for the variant used to encrypt an importer key and MK.exp for the variant used to encrypt an exporter key (where MK.imp and MK.exp are understood as signifying different control vectors for the left and right key halves).

Thus, an importer key K is stored in encrypted form as eMK.imp(K), where K is the value of the importer key in the clear and MK.imp is the importer variant of the master key MK. Similarly, an exporter key K is stored in encrypted form as eMK.exp(K), where K is the clear key value and MK.exp is the exporter master key variant. Other keys that are encrypted under variants of the master key MK in this manner include MAC-generating keys, PIN input keys, and PIN output keys, which are encrypted under master key variants MK.mac, MK.ipk, and MK.opk, respectively. Keys encrypted under a master key variant are decrypted only within the secure boundary of CF 102 and even then only when needed for a particular operation, after which the clear value is erased.

Certain key management functions have been defined for CF 102 that are invoked from CFAP 106 by issuing a Perform Cryptographic Key Management Function (PCKMF) instruction (with the appropriate function code). The key management functions especially relevant to the present invention include the following:

Convert Using Control Vector (CUCV): XORs the key values of two 64-bit data compatibility keys K1 and K2 to produce a resulting key K1 XOR K2 and enciphers the resulting key using a designated master key variant MK.V. Inputs are eMK. S1(V), eMK.S2(K1) and eMK.S2(K2) where eMK.S1(V), eMK.S1(K1), and eMK.S2(K2) denote encryption of the control vector V under the master key variant MK.S1, encryption of the key K1 under the master key variant MK.S2, and encryption of the key K2 under the master key variant MK.S2, respectively; output is eMK.V (K1 XOR K2).

Encrypt under Master Key (EMK): Enciphers the clear value of a cryptographic key K as a data compatibility key using a designated master key variant MK. S. Inputs are K and a specification of S. output is eMK.S(K).

Reencipher Key (RK): Reenciphers a 64-bit key K from the importer variant KEK1.V that is derived using a specified control vector V to the exporter variant KEK2.V that is derived using the same control vector V. Inputs are V, eMK.imp(KEK1), eKEK1.V(K) and eMK.exp(KEK2); output is eKEK2.V(K).

Reencipher To Master Key (RTMK): Reenciphers a 64-bit key K from the importer variant KEK.S that is derived from a designated control vector S to the master key variant MK.S that is derived using the same control vector S. Inputs are eMK.imp(KEK), eKEK.S(K) and a specification of S; output is eMK.S(K).

Reencipher From Master Key (RFMK): Reenciphers a 64-bit key K from the master key variant MK. S that is derived using a designated control vector S to the exporter variant KEK. S that is derived using the same control vector S. Inputs are eMK.exp(KEK), eMK.S(K) and a specification of S; output is eKEK.S(K).

In addition, certain message authentication code (MAC) functions have been defined for CF 102 that are invoked from CFAP 106 by issuing a Perform Cryptographic MAC Function (PCMF) instruction (with the appropriate function code). The MAC function especially relevant to the present invention includes the following:

Generate MAC (GMAC): Generates a 64-bit MAC on a message composed of input blocks X1–Xn using a designated MAC key K and an initial chaining value ICV. Inputs are X1–Xn, ICV and eMK.S(K); output is MAC.

These will be discussed in more detail below as they relate to the present invention.

Limitations on Availability of Strong DES Encryption

For export versions of data encryption products originating from the United States, an encryption system called the Commercial Data Masking Facility (CDMF) has been developed. This system, described in U.S. Pat. No. 5,323,464, incorporated herein by reference, is similar to DES, but uses a weakened key having in effect 40 independent bits. Although strong (56-bit) DES encryption is allowed in export versions of encryption products for certain end uses (e.g., financial applications), encryption for data privacy purposes in such export versions is currently limited to a key strength of 40 independent bits. Thus, referring back to FIG. 1, while CFAP 106 is permitted to perform strong (56-bit) DES encryption for financial applications such as SET, even in an export version, the CFAP cannot rely on a hardware assist from CF 102, since the general encryption functions in the CF are limited to 40-bit keys in the export version.

The present invention overcomes this hardware limitation by using the special encryption functions (i.e., encryption functions other than data encryption) of CF 102, such as those described above, which are not limited to 40-bit keys and retain their full cryptographic strength even in an export version of the CF whose standard data encryption and decryption functions are of limited key strength. In a preferred implementation, the invention is transparent to the application 100 and is realized through changes in CFAP 106 alone, without requiring modification of CF 102. The procedures for encryption and decryption are described separately below.

Encryption Procedure

In one implementation of the present invention, CFAP 106 accomplishes 56-bit hardware DES encryption of data from application 110 using the Generate MAC (GMAC) function of the Perform Cryptographic MAC (PCMF) instruction of CF 102. The invention exploits the fact that for a message consisting of a single data block X, the generated MAC is identical to the output block Y generated by the CBC encryption procedure (FIG. 3) for the same single data block X and chaining value ICV.

Figure 6:
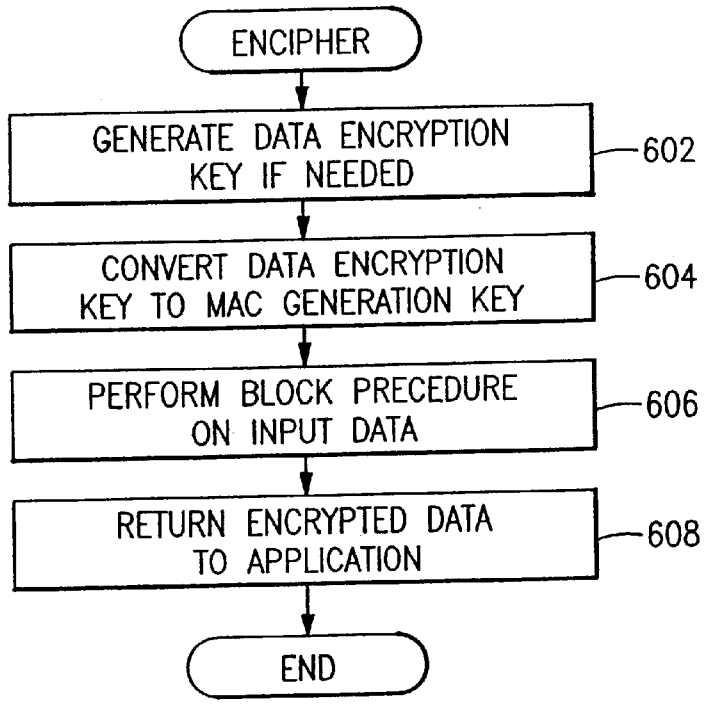
FIG. 6 shows the overall encryption procedure of one implementation of the present invention.

FIG. 6 shows the overall encryption procedure of one implementation of the present invention. This procedure is performed by CFAP 106 upon receiving a request from application 110 (e.g., to compose a SET block) requiring DES encryption. CFAP 106 receives as input parameters from application 110: (1) a plaintext message M requiring encryption, comprising 64-bit plaintext blocks X1–Xn; (2) a 64-bit data encryption key DEK (encrypted under an appropriate master key variant); and (3) a 64-bit initial chaining vector ICV. CFAP 106 takes these input parameters from application 110, performs the CBC encryption procedure shown in FIG. 3, and returns an encrypted ciphertext message C, comprising 64-bit blocks Y1–Yn.

As noted above, the data encryption key DEK is encrypted under a master key variant and never appears in the clear except within the secure boundary of CF 102 when it is decrypted for use in a cryptographic operation (encryption or decryption.).

(As an alternative to receiving an encryption key DEK from application 110, CFAP 106 may generate the key and either save the value itself or return the value to the application 110 (encrypted under the appropriate master key variant). Also, as an alternative to receiving an ICV from the application 110, CFAP 106 may assume a default value (e.g., zero).)

The encryption procedure is as follows. If CFAP 106 does not receive a data encryption key DEK from application 10, then CFAP 106 first generates a key DEK as an odd-parity 8-byte random number and enciphers it under an appropriate master key variant (step 602).

CFAP 106 then transforms the data key DEK into a MAC key having the same clear value but encrypted instead under the MAC master key variant MK.mac (step 604). This MAC key is stored in the form eMK.mac(DEK). Preferably, this conversion is accomplished using the method described in U.S. Pat. No. 5,177,791, entitled "Secure Translation of Usage-Control Values for Cryptographic Keys", incorporated herein by reference.

Figure 8:
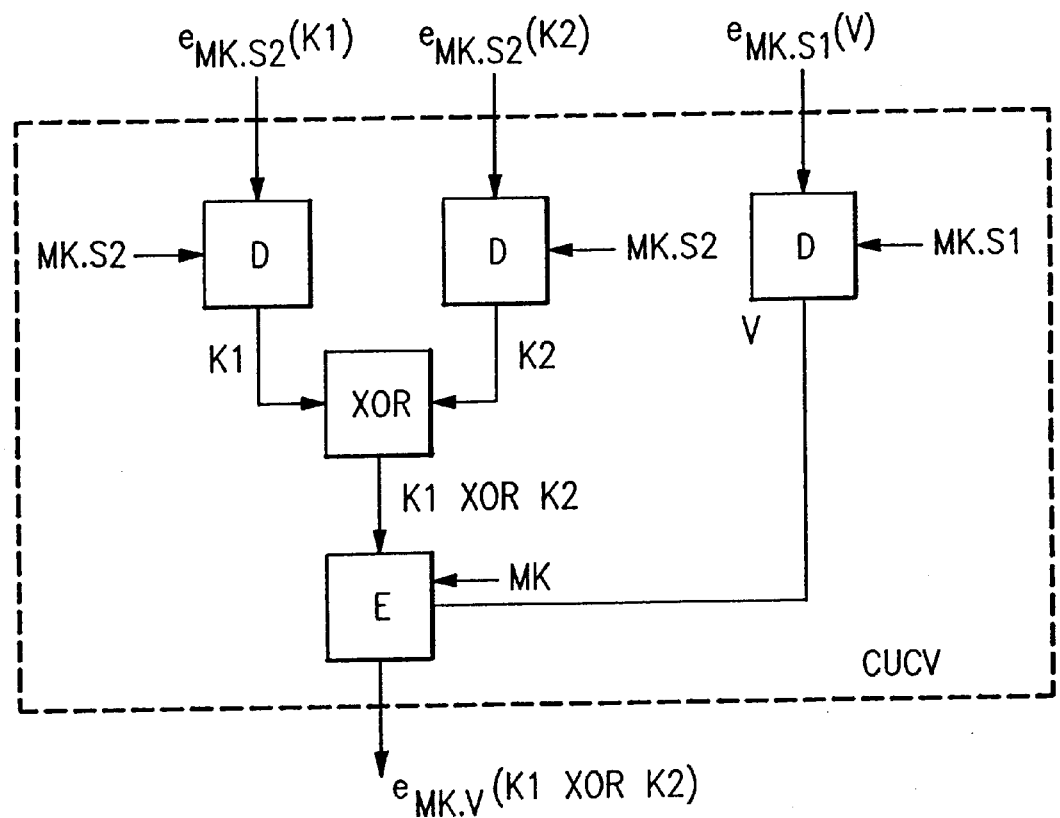
FIG. 8 shows the data transformations performed by a Convert Using Control Vector (CUCV) instruction.

Alternatively, an encrypted MAC key eMK.mac(DEK) may be generated with a Convert Using Control Vector (CUCV) instruction that is part of the instruction set of CF 102. Referring to FIG. 8, in general, and as indicated above, the CUCV instruction takes as input parameters: (1) a 64-bit control vector V encrypted under a master key variant MK.S1 as eMK.S21 (V); (2) a 64-bit key K1 encrypted under a master key variant MK.S2 as eMK.S2(K1); and (3) a 64-bit key K2 encrypted under the master key variant MK.S2 as eMK.S2(K2). CF 102 executes a CUCV instruction by decrypting K1, K2 and V using the appropriate master key variants, XORing the clear values K1 and K2 to generate a new key K1 XOR K2, and encrypting K1 XOR K2 under MK.V as shown in FIG. 5A to generate eMK.V (K1 XOR K2), which is returned to CFAP 106. The CUCV instruction is used to generate an encrypted MAC key eMK.mac(DEK) by supplying DEK as K1, a zero value as K2, and the control vector mac for MAC keys as V (all in appropriately encrypted form).

Figure 2:
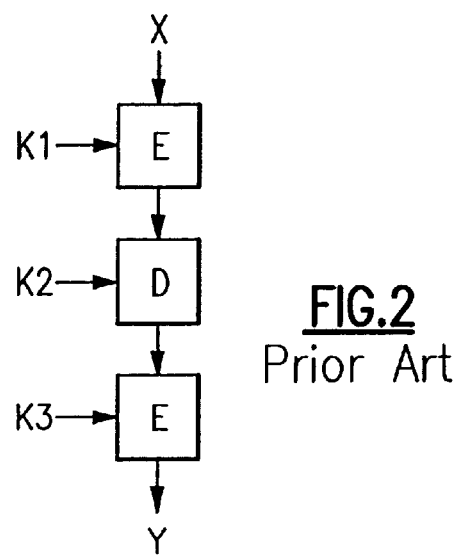
FIG. 2. shows a triple encryption mode of the prior art.

(In FIG. 8 and other figures, boxes labeled "E" denote either single DES encryption or triple DES encryption as shown in FIGS. 2 and 5A–5B, as appropriate to the key length. Similarly, boxes labeled "D" denote either single DES encryption or triple DES decryption, as appropriate to the key length.)

Figure 7:
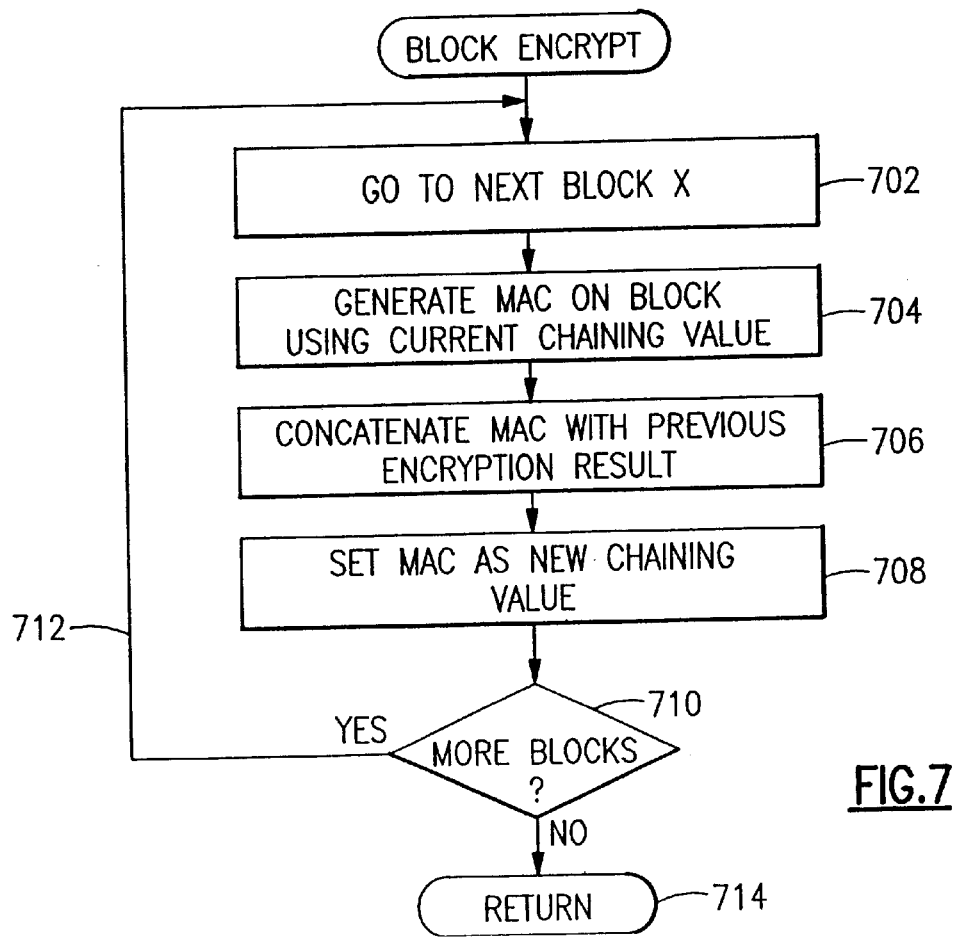
FIG. 7 shows the procedure for encrypting a particular ciphertext data block in the encryption procedure shown in FIG. 6.

CFAP 106 then processes the data X1–Xn, one 64-bit block Xi at a time, using the procedure shown in FIG. 7, to obtain corresponding encrypted data blocks Yi (step 606), which it returns to the application 110 (Step 608).

FIG. 7 shows the procedure for encrypting the data blocks X1–Xn received from application 110. CFAP selects a data block Xi, starting with the first data block X1 received from application 110 (step 702), and encrypts that data block by issuing a GMAC instruction to CF 102 (step 704).

Figure 9:
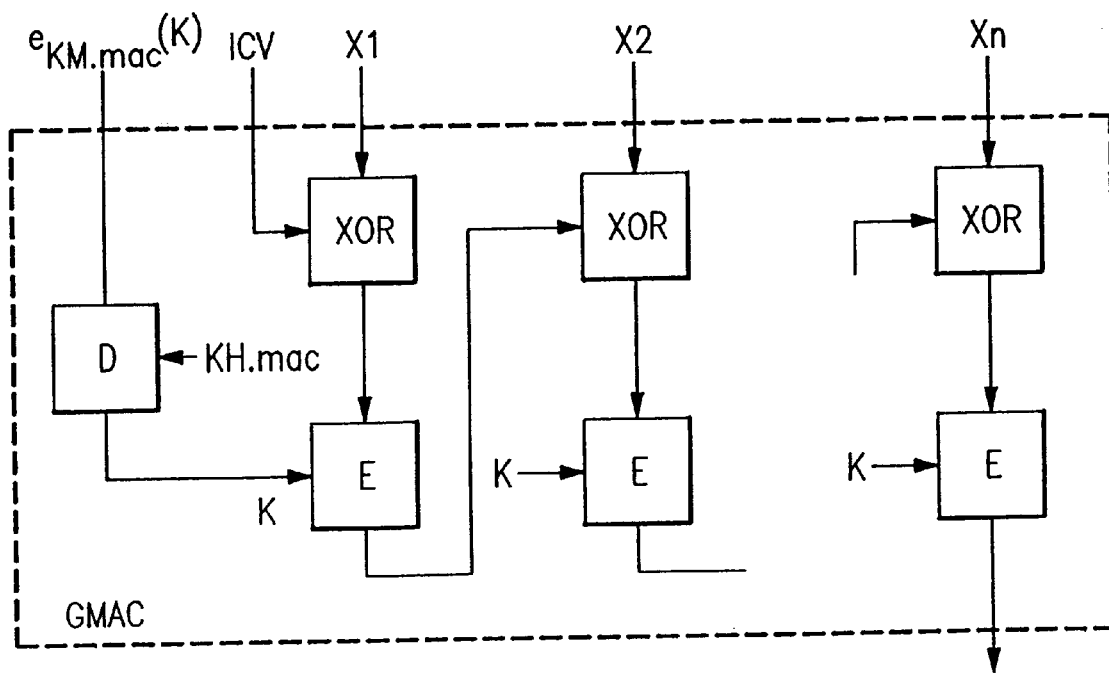
FIG. 9 shows the general data transformations performed by a Generate MAC (GMAC) instruction.

Referring to FIG. 9, in general, and as described above, the GMAC instruction receives as input parameters (1) an input message composed of n 64-bit blocks X1–Xn; (2) an encrypted MAC key eKM.mac(K); and (3) an initial chaining vector ICV. Upon receiving a GMAC instruction with its input parameters, CF 102 decrypts the MAC key K and performs the CBC encryption procedure of FIG. 3, using K as the encryption key and ICV as the initial chaining vector. However, instead of retaining each output block (Yi in FIG. 3), CF 102 discards all but the last output block (MAC), which is returned to CFAP 106.

Figure 3:
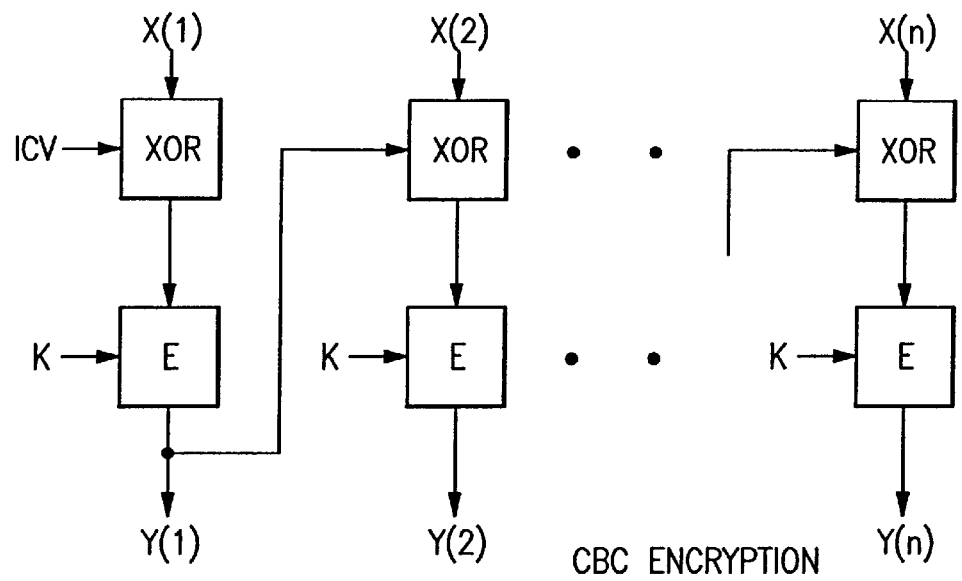
FIG. 3 shows the cipher block chaining (CBC) encryption mode of the prior art.
Figure 10:
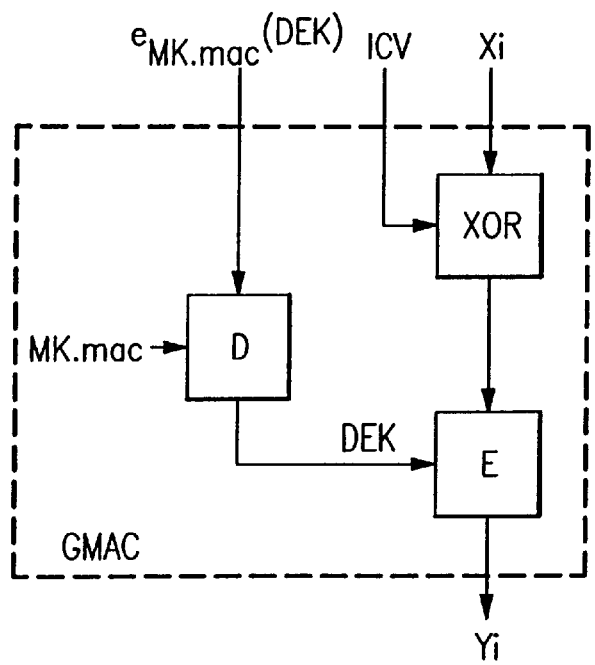
FIG. 10 shows the particular data transformations performed by a Generate MAC (GMAC) instruction as used in the present invention.

As is evident from the above description, the GMAC instruction returns a single 64-bit MAC (=Yn) regardless of the number of input blocks X1–Xn. To generate output blocks Yi that are correctly enciphered as shown in FIG. 3, CFAP 106 invokes the GMAC instruction once for each input block Xi, as shown in FIG. 10. On each invocation, CFAP 106 supplies eMK.mac(DEK) as the encrypted MAC key (i.e., K=DEK). On the first invocation, CFAP supplies X1 as a single-block input message and the ICV value received from the application 110; the return value from CF 102 is saved as Y1. On each subsequent invocation, CFAP 106 supplies the corresponding block Xi as a single-block input message and the previous output value Yi−1 as an ICV, and saves the output value as Yi.

The MAC value thus generated is concatenated with the previous encryption results to begin to form the encrypted data string Y1–Yn; on the first iteration, this will be a zero-length string (step 706). The MAC value also becomes the new chaining value ICV to be supplied to the GMAC (step 708). If there are any remaining 64-bit blocks of data Xi from application 110 to be encrypted (step 710), the procedure returns to step 702 to process the next block Xi (step 712). Otherwise, the procedure returns to step 608 in FIG. 6 (step 714).

The procedure of FIG. 7 continues as above until all input blocks X1–Xn have been processed.

A check for a changed master key MK is made after each invocation of the PCMF function GMAC. A condition code 3 from the PCMF operation will cause the DES data key to be reenciphered under the current master key if necessary, and the PCMF will be retried if retry is indicated.

Decryption Procedure

In accordance with the present invention, hardware decryption of DES-encrypted data from application 110 is performed using hardware cryptographic primitives which do not require that strong encryption be enabled.

The invention relies on the fact that if data is encrypted twice with a weak key (or the keys of a semiweak key pair), the result is the clear form of the data. Thus, if D is a piece of clear text and W is a weak key, then eW(eW(D))=D. Similarly, if W and W' are members of a semiweak key pair, then eW(eW'(D))=eW'(eW(D))=D.

In accordance with this aspect of the present invention, CFAP 106 takes the DES-encrypted data from the application 110, transforms it to being encrypted under a weak key (or a member of a semiweak key pair), and then encrypts it again under the same weak key (or the other of the same weak key pair). The result is the decrypted (i.e., clear) form of the data.

For this processing, a weak DES key encrypted under an exporter variant MK.exp is used. The CUCV instruction is used to create this exporter key-encrypting key. The DES data key (DEK) is converted to an importer key-encrypting key. The CUCV instruction is used to create this key also.

Figure 11:
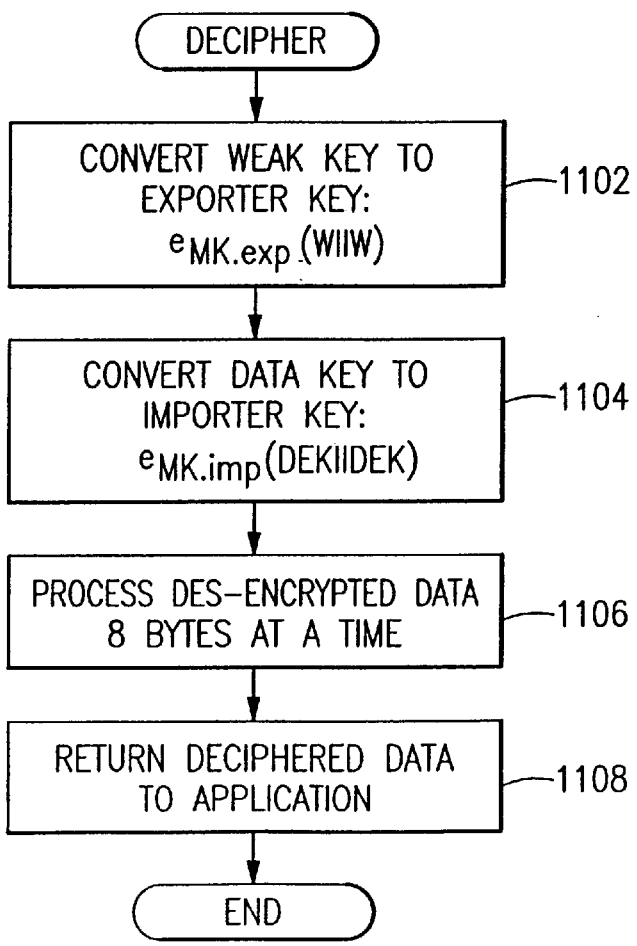
FIG. 11 shows the overall decryption procedure of one implementation of the present invention.

FIG. 11 shows the overall decryption procedure of one implementation of the present invention. This procedure is performed by CFAP 106 upon receiving a request (e.g., a SET Block Decompose service call) from application 110 requiring DES decryption. CFAP 106 receives as input parameters from application 110: (1) a ciphertext message C requiring decryption, comprising 64-bit ciphertext blocks Y1–Yn; (2) a 64-bit data encryption key DEK (encrypted under an appropriate master key variant); and (3) a 64-bit initial chaining vector ICV (if other than zero). CFAP 106 takes these input parameters from application 110, performs the CBC decryption procedure shown in FIG. 4, and returns the original plaintext message M, comprising 64-bit blocks X1–Xn.

The decryption procedure is as follows. CFAP 106 first transforms a weak key W (as defined above) into an exporter key eMK.exp(W||W), encrypted under an exporter variant MK.exp of master key MK (step 1102). (The above expression shows the form in which the exporter key is stored; the clear form of the exporter key is W||W).

Figure 14:
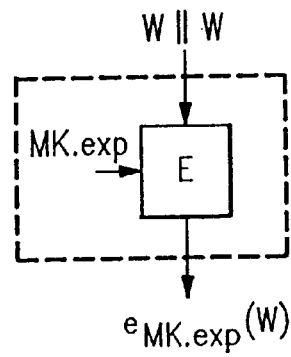
FIG. 14 shows the transformation of a weak encryption key into an exporter key in the procedure shown in FIG. 11.

To create eMK.exp(W||W), CFAP 106 invokes the CUCV instruction twice: once for each half of the 128-bit exporter key being constructed. On the first invocation, CFAP 106 supplies W as key K1, zero as key K2, and V12 as control vector CV, where V12 is the designated control vector CVL for the left half of an exporter key (FIG. 5B), all in the encrypted forms required by the instruction format, to get a result eMK.V12(W). On the second invocation, CFAP 106 supplies W as key K1, zero as key K2, and V14 as control vector CV, where V14 is the designated control vector CVL for the right half of an exporter key (FIG. 5B), all in the encrypted forms required by the instruction format, to get a result eMK.V14(W). The resulting 128-bit exporter key W||W is simply the concatenation of the key halves W and W. Although the two key halves are separately encrypted under different variants MK.V12 and MK.V14 of the master key, the overall encryption may be expressed by the convenient shorthand notation eMK.exp(W||W). FIG. 14 shows the overall result of this procedure.

Next, CFAP 106 transforms the data encryption key DEK received from application 110 into an importer key eMK.imp(DEK||DEK), encrypted under an importer variant MK.imp of master key MK (step 1104). (The above expression likewise shows the form in which the importer key is stored; the clear form of the importer key is DEK||DEK).

Figure 13:
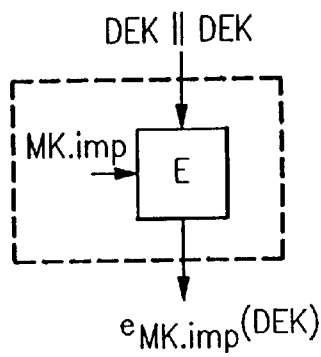
FIG. 13 shows the transformation of the data encryption key into an importer key in the procedure shown in FIG. 11.

To create eMK.imp(DEK||DEK), CFAP 106 invokes the CUCV instruction twice: once for each half of the 128-bit importer key being constructed. On the first invocation, CFAP 106 supplies DEK as key K1, zero as key K2, and V13 as control vector CV, where V13 is the designated control vector CVL for the left half of an importer key (FIG. 5B), all in the encrypted forms required by the instruction format, to get a result eMK.V13(DEK). On the second invocation, CFAP 106 supplies DEK as key K1, zero as key K2, and V15 as control vector CV, where V15 is the designated control vector S2 for the right half of an importer key (FIG. 5B), all in the encrypted forms required by the instruction format, to get a result eMK.V15(DEK). The resulting 128-bit importer key DEK||DEK is simply the concatenation of the key halves DEK and DEK. Although the two key halves are separately encrypted under different variants MK.V13 and MK.V15 of the master key, the overall encryption may be expressed by the convenient shorthand notation eMK.exp(DEK||DEK). FIG. 13 shows the overall result of this procedure.

The enciphered control vectors V12–V15 required for the CUCV processing are generated by the CFAP once at first-time start-up of the CFAP when the cryptographic key data set CKDS is initialized.

(Although the importer and exporter keys are actually double-length keys DEK||DEK and W||W, they are sometimes shown and referred to herein as their single-length counterparts DEK and W. Triple encryption under such concatenated double-length keys is equivalent to single encryption under the corresponding single-length key, as is evident from FIG. 2.)

Figure 12:
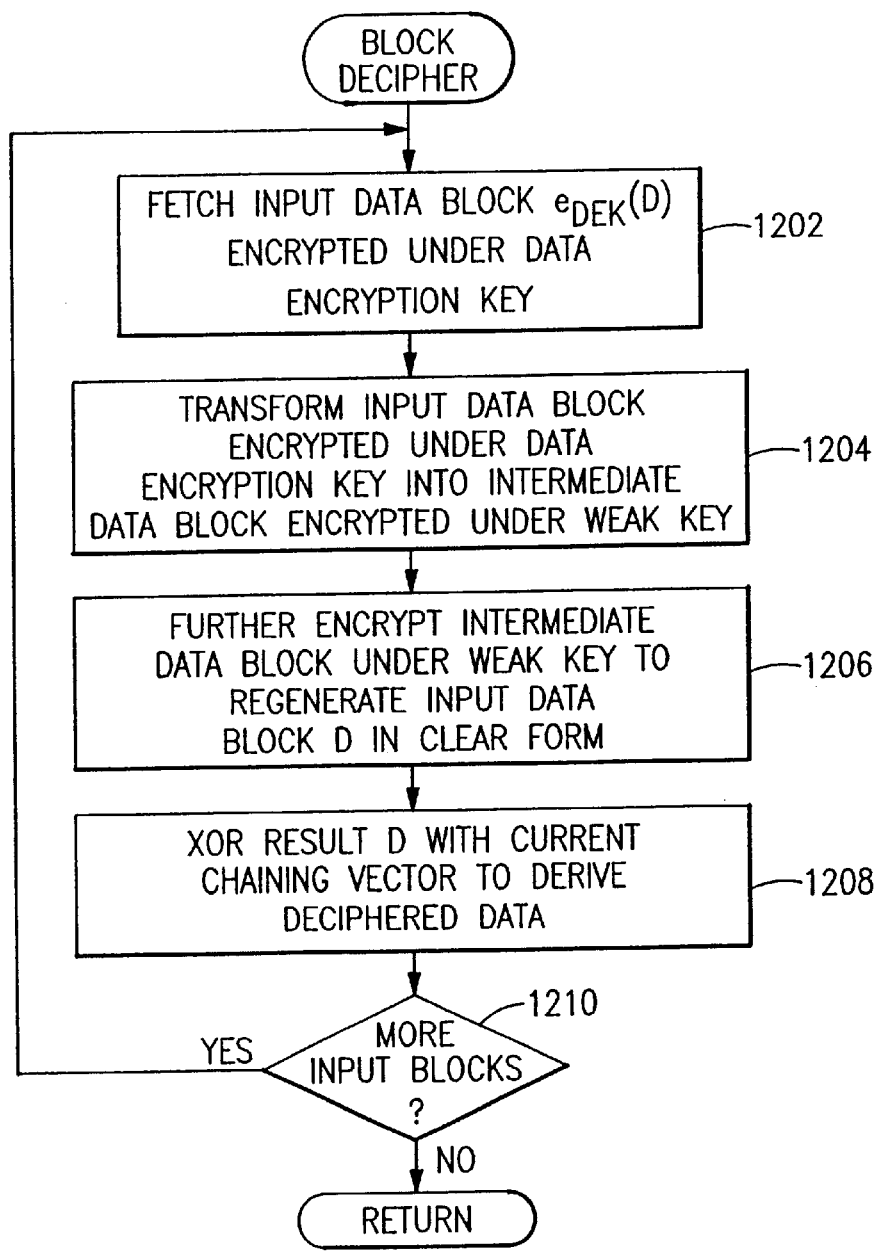
FIG. 12 shows the procedure for decrypting a particular ciphertext data block in the decryption procedure shown in FIG. 11.

CFAP 106 then processes the DES-encrypted data one 8-byte block Yi at a time, beginning with block Y1 and continuing though block Yn, using the procedure shown in FIG. 12 (step 1106). As described below, this procedure performs specified key management operations, in effect treating the data as if it were a key.

Finally, when all the data Y1–Yn has been deciphered, CFAP 106 returns the deciphered data X1–Xn to the application 110 (step 1108).

Figure 15:
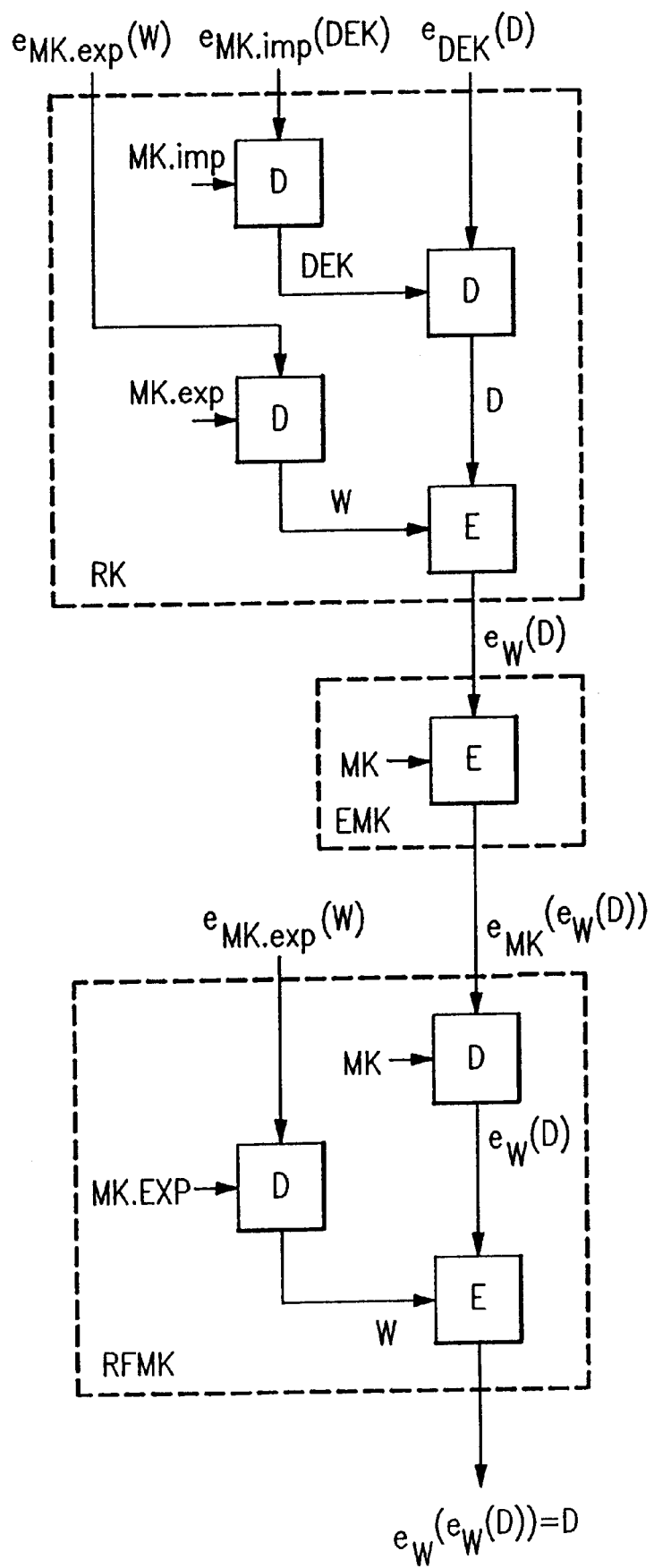
FIG. 15 shows the transformations of a data block performed in the procedure shown in FIG. 11.

FIGS. 12 and 15 shows the procedure for decrypting a particular ciphertext data block eDEK(D), where D=Xi XOR CVi (with CVi being the current chaining vector for block i). FIG. 12 shows the steps performed, while FIG. 15 shows the data transformations involved.

CFAP 106 first fetches the ciphertext data block eDEK(D) as an input data block; this is done by copying 8 bytes of the encrypted data from the application's DES-encrypted data block to CFAP storage (step 1202).

Next, CFAP 106 transforms the input data block eDEK(D) from encryption under the data encryption key DEK to encryption under the weak key W to generate an intermediate data block eW(D) (step 1204).

In the embodiment shown in FIG. 15, this is done by issuing a Reencipher Key (RK) command to CF 102, specifying as input parameters the encrypted importer key eMK.imp(DEK∥DEK), the encrypted exporter key eMK.exp(W∥W), a control vector CV (=0), and the encrypted data eDEK(D). Upon receiving the RK command and input parameters, CF 102 decrypts the importer and exporter keys to generate the keys DEK and W in their clear form, decrypts the input data block eDEK(D) to regenerate the original data block D in clear form, and reencrypts the data block under the weak key to generate the intermediate data block eW(D), which is returned to CFAP 106. Note that while the clear value of the data block D is generated as an intermediate step in the execution of the RK command, it and the other clear values DEK and W are not made available outside CF 102, but are erased after they have been used.

Next, CFAP 106 further encrypts the intermediate data block eW(D) under the weak key W to generate an output block eW(eW(D)) twice encrypted under the weak key W; by virtue of the property of weak keys described above, this regenerates the original data block D in clear form (step 1206).

In the implementation shown in FIG. 15, step 1206 is performed in two operations. CFAP 106 first encrypts the intermediate data block eW(D) under the master key MK to generate a data block eMK(eW(D)) successively encrypted under the weak key W and the master key MK. This is done by issuing an Encrypt under Master Key (EMK) command to CF 102, specifying as an input parameter the intermediate data block eW(D) to be encrypted. (The master key MK is already held by CF 102 and is therefore not supplied as an input parameter.) Upon receiving the EMK command and input parameter, CF 102 encrypts eW(D) under the master key MK to generate the encrypted value eMK(eW(D)), which is returned to CFAP 106.

CFAP then transforms the data block eMK(eW(D)) from encryption under the master key MK to encryption under the exporter key W. This is done by issuing a Reencipher From Master Key (RFMK) command to CF 102, specifying as input parameters the encrypted exporter key eMK.exp(W∥W) and the encrypted data eMK(eW(D)). Upon receiving this command and the input parameters, CF 102 decrypts the exporter key W to generate the key W in its clear form, decrypts eMK(eW(D)) using the master key MK to regenerate the value eW(D), and reencrypts the value eW(D) under the exporter key W to generate the twice encrypted value eW(eW(D))=D, which is returned to CFAP 106.

Upon obtaining the clear value D in step 1206, CFAP 106 XORs the result (D) with the current chaining vector to derive the deciphered data Xi (step 1208). On the first pass through the FIG. 12 loop, the chaining vector is the initial chaining vector ICV received from the application 110. On each subsequent pass, the chaining vector is the previous eight bytes of encrypted data.

If there are any remaining blocks of data Yi, the procedure is repeated from step 1202 for each additional block of data, processing 8 bytes at a time, until all such blocks have been processed (step 1210).

After each crypto instruction, a check is made for a condition code 3. A condition code 3 from the instruction will cause the DES data key to be reenciphered under the current master key MK if necessary, and the crypto instruction will be retried if retry is indicated.

In the implementation shown in FIG. 15, a single CF instruction, Reencipher Key (RK), was used to transform the input value from encryption under the data key DEK to encryption under the weak key W. Alternatively, or if an RK instruction is not available, this reencryption may be accomplished by first transforming from a value eDEK(D) under the importer key DEK to a value eMK(D) encrypted under the master key MK and then transforming from a value eMK(D) encrypted under the master key MK to a value eW(D) under the exporter key W.

Figure 16:
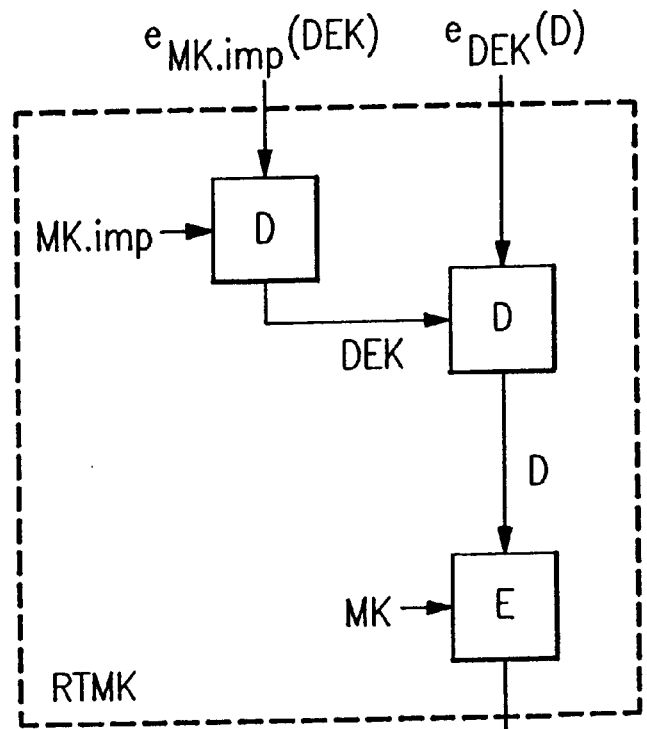
FIG. 16 shows the transformations of a data block performed in one modification of the decryption procedure shown in FIG. 11.
Figure 16:
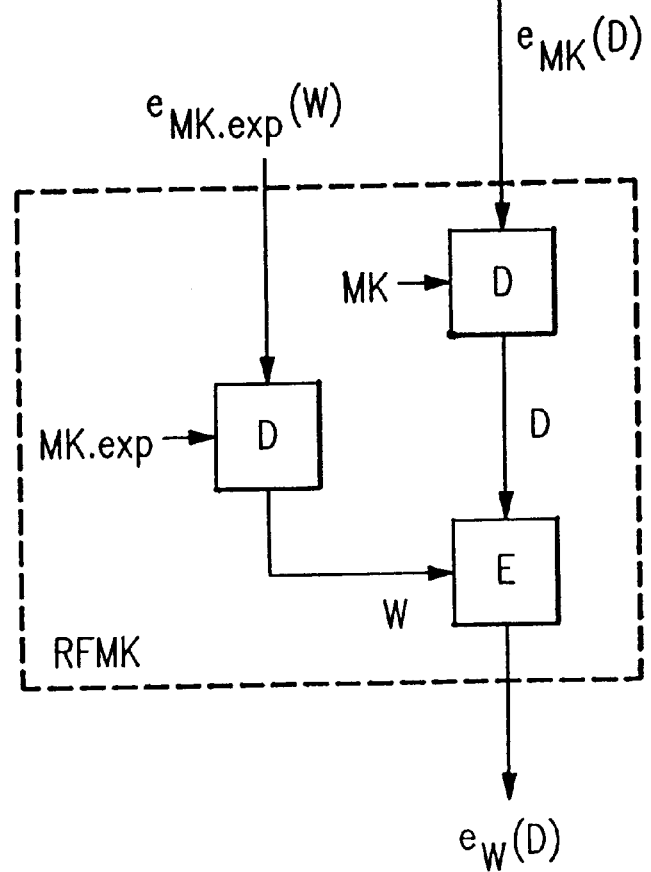

Referring to FIG. 16, this is done by having CFAP 106 issue to CF 102 a Reencipher To Master Key (RTMK) command, followed by a Reencipher From Master Key (RFMK) command. The RTMK command specifies as input parameters the encrypted importer key eMK.imp(DEK∥DEK) and the encrypted data eDEK(D). Upon receiving the RTMK command and input parameters, CF 102 decrypts the importer key DEK to generate the key in its clear form, decrypts the input data block eDEK(D) to regenerate the original data block D in clear form, and reencrypts the data block under the master key MK to generate a data block eMK(D), which is returned to CFAP 106. The RFMK command specifies as input parameters the encrypted exporter key eMK.exp(W∥W) and the reencrypted data eMK(D) just returned from CF 102. Upon receiving the RFMK command and input parameters, CF 102 decrypts the exporter key W to generate the key in its clear form, decrypts the input data block eMK(D) to regenerate the original data block D in clear form, and reencrypts the data block under the exporter key W to generate the data block eW(D), which is returned to CFAP 106.

In the decryption implementations described above, the encrypted data is reencrypted under a weak key W and the result then further encrypted under the same weak key W. It will be apparent to those skilled in the art that a similar result could be obtained by reencrypting the encrypted data under one key W of a semiweak key pair W, W' and then further encrypting the result under the other weak key of the pair.

In the implementation shown in FIG. 15, the second encryption under a weak key W is performed by encrypting under a master key MK, then transforming the encryption to encryption under the key W as an exporter key. Alternatively, the second encryption under W may be performed by generating a MAC on eW(D), using W as a MAC key as described in the encryption section above. Conversely, data encryption may be performed by cascading EMK and RFMK commands, rather than using the MAC procedure described above.

Figure 17:
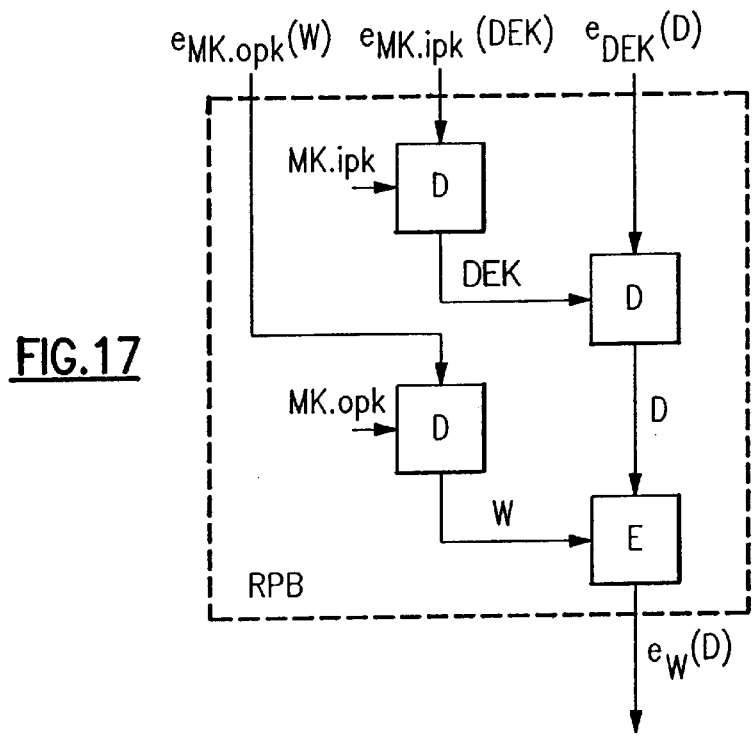
FIG. 17 shows the transformations of a data block performed in another modification of the procedure shown in FIG. 11.
Figures 18, 19:
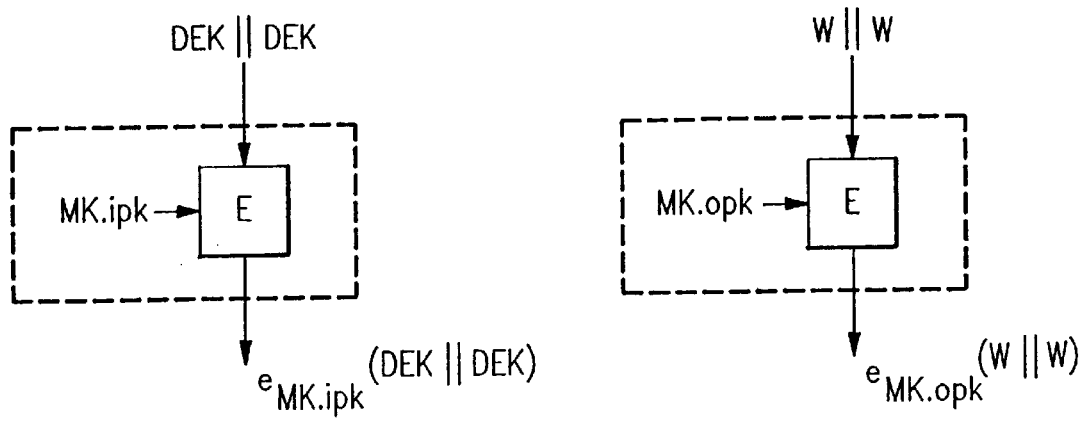
FIG. 18 shows the transformation of the data encryption key into PIN input key in the modified procedure shown in FIG. 17.
FIG. 19 shows the transformation of a weak encryption key into a PIN output key in the modified procedure shown in FIG. 17.

The transformation from encryption under the data key DEK to encryption under a weak key W can also be performed using a Reencipher Pin Block (RPB) command, which is similar to the RK command except that it transforms a 64-bit personal identification number (PIN) block from encryption under an input PIN key to encryption under an output PIN key. This command would be used by transforming DEK‖DEK to an encrypted input PIN key eMK.ipk(DEK‖DEK) as shown in FIG. 18, transforming W‖W to an encrypted output PIN key eMK.opk(W‖W) as shown in FIG. 19, and issuing the RPB instruction with eDEK(D) as an encrypted PIN block to obtain a reencrypted PIN block eW(D) as shown in FIG. 17.

Various modifications will be apparent to those skilled in the art. Thus, while the foregoing description has assumed DES encryption and decryption, other encryption systems that have similar relevant properties (e.g., a derivative MAC function a set of weak or semiweak keys) can be used instead. Similarly, while the description has assumed a CBC mode of encryption and decryption, other modes such as the ECB mode could be used instead. Still other variations and modifications will be apparent to those skilled in the art.

What is claimed is:

1. In a cryptographic system having a cryptographic facility providing cryptographic functions for transforming blocks of data, said cryptographic functions including (a) an encryption function for encrypting an input block under a key in accordance with a predetermined encryption procedure to produce an output block comprising said input block encrypted under said key, said encryption procedure being a symmetric encryption procedure having a corresponding decryption procedure for decrypting said output block using said key to regenerate said input block, and (b) a reencryption function for reencrypting under a second key in accordance with said procedure an input block comprising an original plaintext block that has been encrypted under a first key in accordance with said procedure to produce an output block comprising said original plaintext block encrypted under said second key, said procedure having at least one key pair with the property that successive encryption of a block under the keys of said pair in accordance with said procedure regenerates said block in clear form, a method for decrypting a ciphertext block comprising an original plaintext block that has been encrypted under a predetermined key in accordance with said procedure, comprising the steps of:

invoking said reencryption function with said ciphertext block supplied as an input block, said predetermined key supplied as a first key, and one of said key pair supplied as a second key to produce a first output block comprising said original plaintext block encrypted under said one of said key pair; and invoking said encryption function with said first output block supplied as an input block and the other of said key pair supplied as a key to produce a second output block comprising said original plaintext block successively encrypted under the keys of said key pair, thereby to regenerate said original plaintext block in clear form.

2. The method of claim 1 in which the keys of said key pair are the same.

3. The method of claim 1 in which the keys of said key pair are different.

4. The method of claim 1 in which said reencryption function transforms a key encrypted under a first key-encrypting key to said key encrypted under a second key-encrypting key, said step of invoking said reencryption function comprising the steps of:

establishing said predetermined key as said first key-encrypting key;

establishing said one of said key pair as said second key-encrypting key; and transforming said input block as a key, using said reencryption function, from encryption under said predetermined key as a first key-encrypting key to encryption under said one of said key pair as a second key-encrypting key.

5. The method of claim 4 in which said first key-encrypting key is an importer key and said second key-encrypting key is an exporter key.

6. The method of claim 1 in which said reencryption function transforms a PIN block encrypted under a first PIN-encrypting key to said PIN block encrypted under a second PIN-encrypting key, said step of invoking said reencryption function comprising the steps of:

establishing said predetermined key as said first PIN-encrypting key;

establishing said one of said key pair as said second PIN-encrypting key; and transforming said input block as a PIN block, using said reencryption function, from encryption under said predetermined key as a first PIN-encrypting key to encryption under said one of said key pair as a second PIN-encrypting key.

7. The method of claim 6 in which said first key-encrypting key is an input PIN key and said second key-encrypting key is an output PIN key.

8. The method of claim 1 in which said reencryption function comprises a first transformation function for transforming said block from encryption under said first key to encryption under a master key and a second transformation function for transforming said block from encryption under said master key to encryption under said second key, said step of invoking said reencryption function comprising the steps of:

transforming said block from encryption under said predetermined key to encryption under said master key using said first transformation function; and transforming said block from encryption under said master key to encryption under said one of said key pair using said second transformation function.

9. The method of claim 1 in which said encryption function comprises a master key encryption function for encrypting said block under a master key and a master key transformation function for transforming said block from encryption under said master key to encryption under said other of said key pair, said step of invoking said encryption function comprising the steps of:

encrypting said first output block under said master key using said master key encryption function, and transforming said first output block from encryption under said master key to encryption under said other of said key pair using said master key transformation function.

10. The method of claim 1 in which said encryption function comprises a message authentication function for generating a message authentication code on an message block, said step of invoking said encryption function comprising the step of:

generating a message authentication code on said input block using said message authentication function.

11. In a cryptographic system having a cryptographic facility providing cryptographic functions for transforming blocks of data, said cryptographic functions including (a) an encryption function for encrypting an input block under a key in accordance with a predetermined encryption algorithm to produce an output block comprising said input block encrypted under said key, said encryption procedure being a symmetric encryption procedure having a corresponding decryption procedure for decrypting said output block using said key to regenerate said input block, and (b) a reencryption function for reencrypting under a second key in accordance with said procedure an input block comprising an original plaintext block that has been encrypted under a first key in accordance with said procedure to produce an output block comprising said original plaintext block encrypted under said second key, said procedure having at least one key pair with the property that successive encryption of a block under the keys of said pair in accordance with said procedure regenerates said block in clear form, apparatus for decrypting a ciphertext block comprising an original plaintext block that has been encrypted under a predetermined key in accordance with said procedure, comprising:

means for invoking said reencryption function with said ciphertext block supplied as an input block, said predetermined key supplied as a first key, and one of said key pair supplied as a second key to produce a first output block comprising said original plaintext block encrypted under said one of said key pair; and means for invoking said encryption function with said first output block supplied as an input block and the other of said key pair supplied as a key to produce a second output block comprising said original plaintext block successively encrypted under the keys of said key pair, thereby to regenerate said original plaintext block in clear form.

12. The apparatus of claim 11 in which said reencryption function transforms a key encrypted under a first key-encrypting key to said key encrypted under a second key-encrypting key, said means for invoking said reencryption function comprising:

means for establishing said predetermined key as said first key-encrypting key;

means for establishing said one of said key pair as said second key-encrypting key; and means for transforming said input block as a key, using said reencryption function, from encryption under said predetermined key as a first key-encrypting key to encryption under said one of said key pair as a second key-encrypting key.

13. The apparatus of claim 11 in which said reencryption function transforms a PIN block encrypted under a first PIN-encrypting key to said PIN block encrypted under a second PIN-encrypting key, said means for invoking said reencryption function comprising:

means for establishing said predetermined key as said first PIN-encrypting key;

means for establishing said one of said key pair as said second PIN-encrypting key; and means for transforming said input block as a PIN block, using said reencryption function, from encryption under said predetermined key as a first PIN-encrypting key to encryption under said one of said key pair as a second PIN-encrypting key.

14. The apparatus of claim 11 in which said reencryption function comprises a first transformation function for transforming said block from encryption under said first key to encryption under a master key and a second transformation function for transforming said block from encryption under said master key to encryption under said second key, said means for invoking said reencryption function comprising:

means for transforming said block from encryption under said predetermined key to encryption under said master key using said first transformation function; and means for transforming said block from encryption under said master key to encryption under said one of said key pair using said second transformation function.

15. The apparatus of claim 11 in which said encryption function comprises a master key encryption function for encrypting said block under a master key and a master key transformation function for transforming said block from encryption under said master key to encryption under said other of said key pair, said means for invoking said encryption function comprising:

means for encrypting said first output block under said master key using said master key encryption function; and means for transforming said first output block from encryption under said master key to encryption under said other of said key pair using said master key transformation function.

16. The apparatus of claim 11 in which said encryption function comprises a message authentication function for generating a message authentication code on an message block, said means for invoking said encryption function comprising:

means for generating a message authentication code on said input block using said message authentication function.

17. A program storage device readable by a machine, tangibly embodying a program of instructions executable by the machine to perform method steps for decrypting a ciphertext block comprising an original plaintext block that has been encrypted under a predetermined key in accordance with a predetermined encryption procedure in a cryptographic system having a cryptographic facility providing cryptographic functions for transforming blocks of data, said cryptographic functions including (a) an encryption function for encrypting an input block under a key in accordance with said procedure to produce an output block comprising said input block encrypted under said key, said encryption procedure being a symmetric encryption procedure having a corresponding decryption procedure for decrypting said output block using said key to regenerate said input block, and (b) a reencryption function for reencrypting under a second key in accordance with said procedure an input block comprising an original plaintext block that has been encrypted under a first key in accordance with said procedure to produce an output block comprising said original plaintext block encrypted under said second key, said procedure having at least one key pair with the property that successive encryption of a block under the keys of said pair in accordance with said procedure regenerates said block in clear form, said method steps comprising:

invoking said reencryption function with said ciphertext block supplied as an input block, said predetermined key supplied as a first key, and one of said key pair supplied as a second key to produce a first output block comprising said original plaintext block encrypted under said one of said key pair; and invoking said encryption function with said first output block supplied as an input block and the other of said key pair supplied as a key to produce a second output block comprising said original plaintext block successively encrypted under the keys of said key pair, thereby to regenerate said original plaintext block in clear form.

18. The program storage device of claim 17 in which said reencryption function transforms a key encrypted under a first key-encrypting key to said key encrypted under a second key-encrypting key, said step of invoking said reencryption function comprising the steps of:

establishing said predetermined key as said first key-encrypting key;

establishing said one of said key pair as said second key-encrypting key; and transforming said input block as a key, using said reencryption function, from encryption under said predetermined key as a first key-encrypting key to encryption under said one of said key pair as a second key-encrypting key.

19. The program storage device of claim 17 in which said reencryption function transforms a PIN block encrypted under a first PIN-encrypting key to said PIN block encrypted under a second PIN-encrypting key, said step of invoking said reencryption function comprising the steps of:

establishing said predetermined key as said first PIN-encrypting key;

establishing said one of said key pair as said second PIN-encrypting key; and transforming said input block as a PIN block, using said reencryption function, from encryption under said predetermined key as a first PIN-encrypting key to encryption under said one of said key pair as a second PIN-encrypting key.

20. The program storage device of claim 17 in which said reencryption function comprises a first transformation function for transforming said block from encryption under said first key to encryption under a master key and a second transformation function for transforming said block from encryption under said master key to encryption under said second key, said step of invoking said reencryption function comprising the steps of:

transforming said block from encryption under said predetermined key to encryption under said master key using said first transformation function; and transforming said block from encryption under said master key to encryption under said one of said key pair using said second transformation function.

21. The program storage device of claim 17 in which said encryption function comprises a master key encryption function for encrypting said block under a master key and a master key transformation function for transforming said block from encryption under said master key to encryption under said other of said key pair, said step of invoking said encryption function comprising the steps of:

encrypting said first output block under said master key using said master key encryption function; and transforming said first output block from encryption under said master key to encryption under said other of said key pair using said master key transformation function.

22. The program storage device of claim 17 in which said encryption function comprises a message authentication function for generating a message authentication code on an message block, said step of invoking said encryption function comprising the step of:

generating a message authentication code on said input block using said message authentication function.

\* \* \* \* \*